United States Patent [19]
Maemura

[11] Patent Number: 5,559,985
[45] Date of Patent: Sep. 24, 1996

[54] CACHE MEMORY HAVING IMPROVED HIT RATIO BY SELECTING THE NUMBER OF BUS CYCLES REQUIRED FOR BLOCK REPLACEMENT

[75] Inventor: Kouji Maemura, Kanagawa, Japan

[73] Assignee: NEC Corporation, Japan

[21] Appl. No.: 115,223

[22] Filed: Sep. 1, 1993

[30] Foreign Application Priority Data

Sep. 3, 1992 [JP] Japan .................................. 4-235764

[51] Int. Cl.[6] ........................................................ G06F 13/14
[52] U.S. Cl. ..................................... 395/467; 395/445
[58] Field of Search ....................................... 395/445, 465, 395/467

[56] References Cited

U.S. PATENT DOCUMENTS 4,315,312  2/1982  Schmidt ............................. 395/497.03

*Primary Examiner*—David L. Robertson
*Attorney, Agent, or Firm*—Whitham, Curtis, Whitham & McGinn

[57] ABSTRACT

A microprocessor incorporating a cache memory unit according to the present invention sets at the register the number of bus cycles activated by the bus cycle control circuit for replacement when a miss occurs at the cache memory, through the program executed at the instruction execution unit according to whether the accessed data are contiguous or non-contiguous. The number counted at the counter of the activated bus cycles and the number set and held at the register are compared by the comparer. The comparer outputs the replacement completion signal when they are identical. The cache control circuit outputs the replacement request signal to request bus cycle activation to the bus cycle control circuit until receipt of the replacement completion signal from the comparer.

20 Claims, 6 Drawing Sheets

TRUTH TABLE FOR COMBINATIONAL CIRCUIT

| T1 | T2 | RPREQ | TOT1 | TOT2 |
|----|----|-------|------|------|
| —  | —  | 0     | 0    | 0    |
| 0  | —  | 1     | 1    | 0    |
| 1  | —  | —     | 0    | 1    |

RPREQ : CACHE REPLACEMENT REQUEST SIGNAL 104
TOT1 AND TOT2 : OUTPUT OF COMBINATIONAL CIRCUIT

CACHE MEMORY HAVING IMPROVED HIT RATIO BY SELECTING THE NUMBER OF BUS CYCLES REQUIRED FOR BLOCK REPLACEMENT

BACKGROUNDS OF THE INVENTION

1. Field of the Invention

This invention relates to a microprocessor incorporating a cache memory and particularly relates to a microprocessor incorporating a cache memory unit characterized by its cache replacement control when the incorporated cache memory fails to hit.

2. Description of the Related Art

Recent microprocessors tend to incorporate a cache memory for speedy memory access. The performance of such microprocessors mainly depends on the capacity and block size of their incorporating cache memory. The larger the cache memory capacity is, the higher the data hit ratio becomes with improving the microprocessor performance. Microprocessors, however, require a number of control circuits inside and the incorporated cache memory capacity cannot be more than a few kilobytes due to limitation imposed by chip size. This results in a low hit ratio at present.

The block size is the quantity of data to be replaced at a time upon a miss at the cache memory. Since one block is contiguously disposed on the memory, the hit ratio of the cache memory becomes higher for a larger block size in case of contiguous programs and data. For non-contiguous data, however, the hit ratio becomes lower even if the block size is large; a large block size may deteriorate the performance because many bus cycles are needed for a single cache memory replacement.

In a typical microprocessor with an incorporated cache memory, an instruction code is output from a cache memory in a cache unit and sent to an instruction execution unit via a data bus. Then, the instruction execution unit decodes the instruction code and executes the processing directed by the instruction code. If the instruction involves a memory access, then the applicable memory address is sent to the cache unit via an address bus. The cache unit, upon receipt of the address, indexes the cache memory contained therein via the address. If the desired data is located in the cache memory, the applicable data in the cache memory is immediately sent to the instruction execution unit via the data bus.

If the desired data is not located (miss) in the cache memory, the cache control circuit in the cache unit outputs a cache replacement request signal so that the main storage is accessed via an external address terminal and an external data terminal for cache memory replacement. In this case, the cache memory outputs a miss address to the external address terminal and the data read out of the main storage is registered to the internal cache memory via the external data terminal. The cache replacement request signal is kept active until completion of a series of cache replacement procedures, during which the instruction execution unit cannot proceed to the next instruction execution.

In a conventional microprocessor incorporating a cache memory as described above, the number of bus cycles required for cache replacement is fixed. Therefore, when many bus cycles are needed for cache replacement, access of non-contiguous data involves long waiting time for cache replacement completion (time from the transfer of data which caused the miss until access to the cache memory after replacement completion) in case of a miss at the cache memory, which may result in lower processing performance.

SUMMARY OF THE INVENTION

An object of the present invention is to provide a microprocessor incorporating a cache memory with a higher hit ratio at the cache memory for contiguous data and reduced overhead due to cache replacement completion waiting time for non-contiguous data, by eliminating the conventional drawbacks described above and enabling setting of the number of bus cycles for cache replacement by the program.

According to a preferred embodiment of the present invention to attain the above object, a microprocessor incorporating a cache memory unit comprises an instruction execution unit for decoding and execution of instructions and a cache memory unit, and the cache memory unit further comprises a cache memory, an address holding means to hold the address to index the cache memory, an address updating means to update the address in the address holding means during hitting of the cache memory, a bus cycle control means to activate bus cycles for replacement upon a miss at the cache memory, a counting means to count the number of bus cycles activated by the bus cycle control means, a bus cycle number holding means to keep the specified value for the bus cycle number, a comparison means to compare the count value at the counting means and the value at the bus cycle number holding means and output the replacement completion signal when they are identical, and a cache control means which outputs the replacement request signal to request activation of bus cycles to the bus cycle control means until receipt of the replacement completion signal from the comparison means when a miss occurs at the cache memory.

According to a further preferred embodiment, the bus cycle control means comprises a bus cycle generation means to provide bus cycles for replacement upon a replacement request signal from the cache control means and a means to output to the cache control means a replacement data transmission signal to direct registration of the data replaced according to the bus cycles to the cache memory.

According to still another preferred embodiment, the number specified for the bus cycles to be held at the bus cycle number holding means is set by the replacement number setting signal output through the program executed at the instruction execution unit. Besides, the specified value for bus cycles to be held at the bus cycle number holding means is set according to whether the accessed data are contiguous or not.

According to another preferred embodiment of the present invention, a microprocessor incorporating a cache memory unit comprises an instruction execution unit for decoding and execution of instructions and a cache memory unit, and the cache memory unit further comprises a cache memory, an address holding means to hold the address to index the cache memory, an address updating means to update the address in the address holding means during accessing of the cache memory, a bus cycle control means to activate bus cycles for replacement upon a miss at the cache memory, a counting means to count the number of bus cycles activated by the bus cycle control means, a bus cycle number holding means to keep the specified value for the bus cycle number set through the program executed at the instruction execution unit corresponding to contiguousness or non-contiguousness of the data accessed by the instruction execution unit, a comparison means to compare the count value at the counting means and the value at the bus cycle number holding means and output the replacement completion signal when they are identical and a cache control means which outputs the replacement request signal to request activation of bus cycles to the bus cycle control means until receipt of the replacement completion signal from the comparison means when a miss occurs at the cache memory.

Other objects, characteristics and effects of the present invention will be clarified in the detailed description below.

DESCRIPTION OF THE PREFERRED EMBODIMENT

Figure 1:
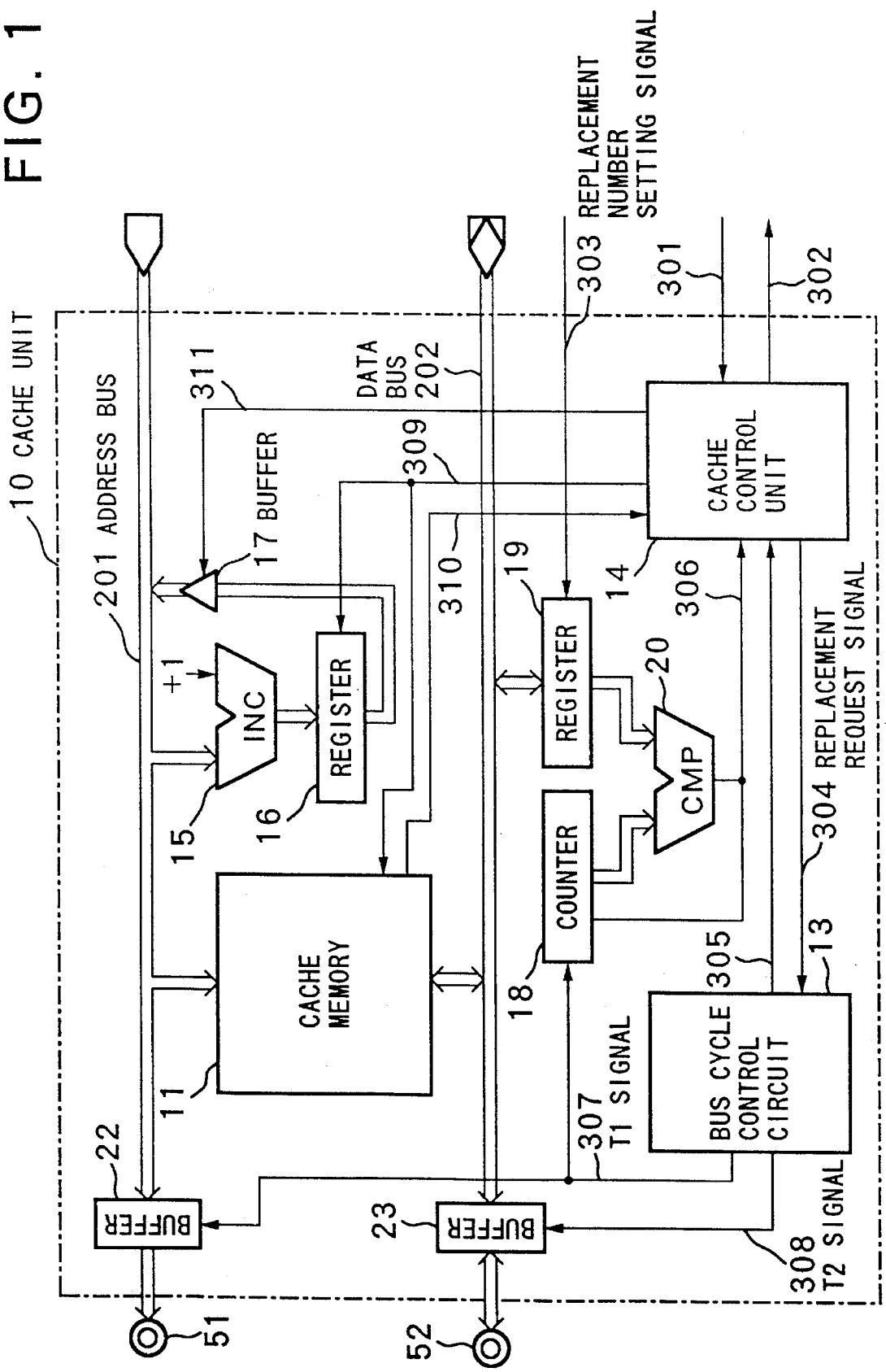
FIG. 1 is a block diagram to show the configuration of a cache memory unit according to an embodiment of the present invention.
Figure 2:
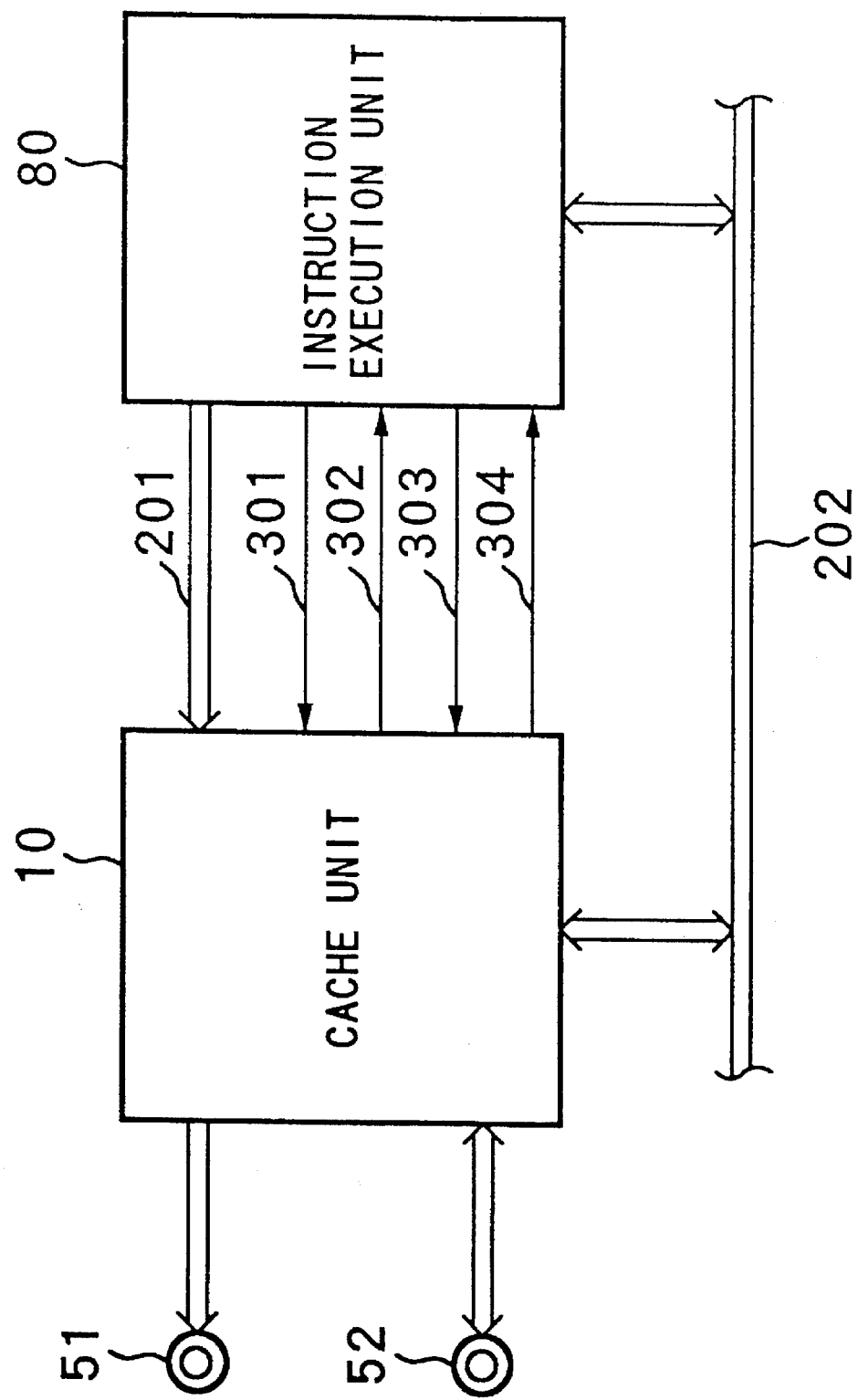
FIG. 2 is a block diagram to show the configuration outline of a microprocessor incorporating a cache memory unit according to the present invention.

Referring to FIGS. 1 to 7, preferred embodiments of the present invention will be described below. Firstly, FIG. 2 shows the entire configuration example of a microprocessor incorporating a cache memory unit according to the present invention. In the figure, the microprocessor comprises a cache memory unit 10 consisting of a cache memory and a control means therefor and an instruction execution unit 80 to decode the instruction codes sent from the cache memory unit 10 and execute instructions such as arithmetic operations. The reference numeral 51 indicates an external address terminal to output addresses to an external main memory, 52 indicates an external data terminal where the data read from an external main memory is input, 201 is an address bus and 202 is a data bus.

FIG. 1 is a block diagram to show the internal configuration of the cache memory unit 10. In the figure, the cache memory unit 10 comprises a cache memory 11, a cache control circuit 14 to control the cache memory 11, a bus cycle control circuit 13 which activates bus cycles upon receipt of a cache replacement request signal 304 generated at the cache control circuit 14, an address updater 15, a register to receive the output from the address updater 15, buffers 17, 22 and 23, a counter 18 to count the number of bus cycles, a register 19 to set the number of bus cycles required for replacement through the program executed at the instruction execution unit 80 and a comparer 20 to compare the contents in the counter 18 and those in the register 19 and output a replacement completion signal 306.

The present embodiment is mainly characterized by its configuration with the register 19 which receives a replacement number setting signal 303 from the instruction execution unit 80 and keeps the number of replacements and the comparer 20 as a means to output the replacement completion signal 306.

Referring now to FIGS. 1 and 2, the instruction execution operation is described. In the figures, an instruction code output from the cache memory 11 in the cache unit 10 is sent to the instruction execution unit 80 via the data bus 202. At the same time, the cache control circuit 14 in the cache unit 10 outputs a data transmission signal 302 to the instruction execution unit 80 for proper data transmission timing. Then, the instruction execution unit 80 decodes the instruction code and executes the processing directed by the instruction code. If the instruction involves a memory access, then the applicable memory address is sent to the cache unit 10 via the address bus 201. The timing to send such address is given to the cache unit 10 by means of an address transmission signal 301.

Figure 3:
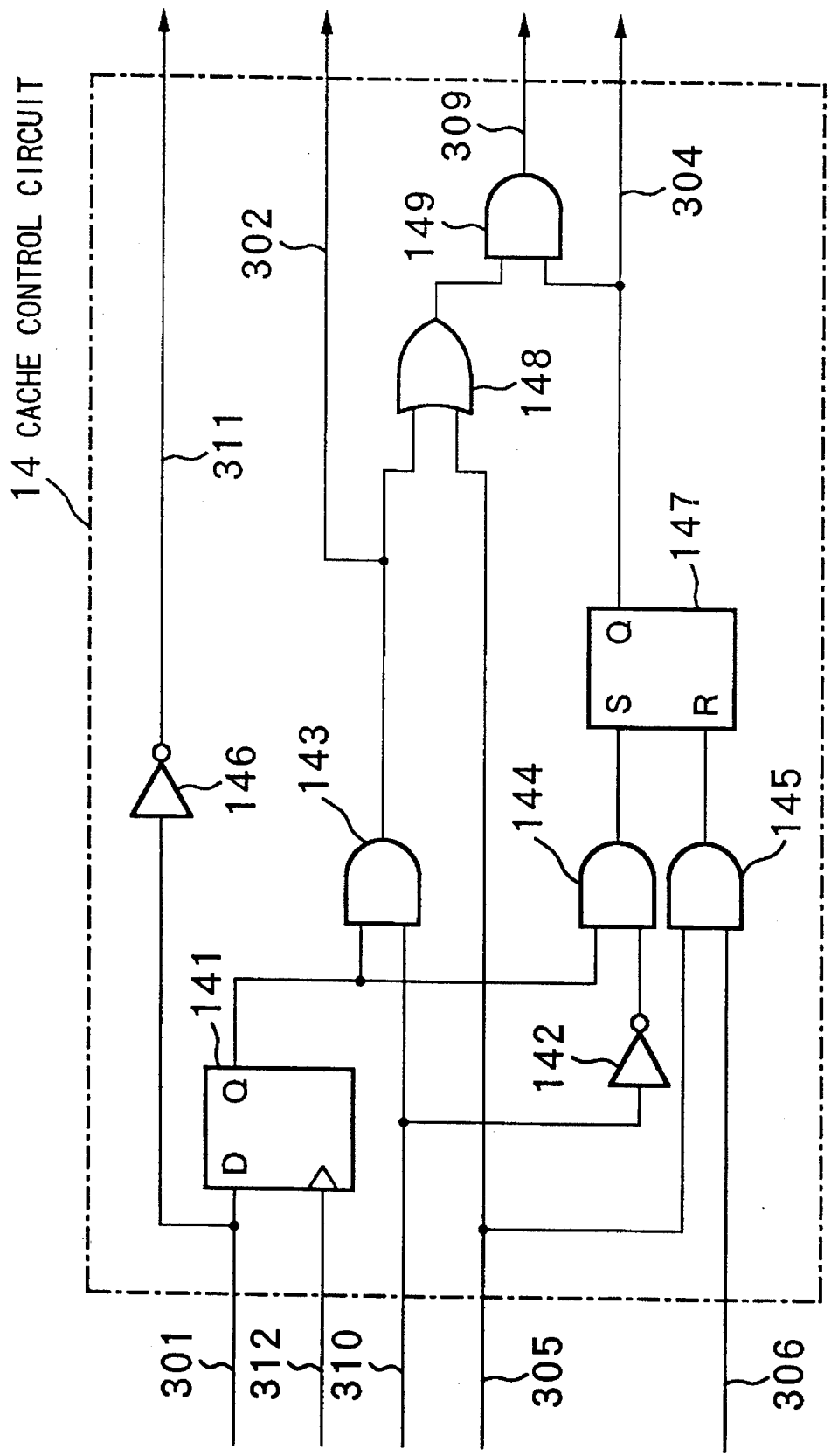
FIG. 3 is a block diagram to show the internal configuration of a cache control circuit of FIG. 1.

FIG. 3 is a schematic circuit diagram to show the internal configuration of the cache control circuit 14, which generates and outputs the cache replacement request signal 304 to request the bus cycle control circuit 13 to replace the cache memory 11. The cache control circuit 14 comprises a D-type bistable circuit 141, inverters 142 and 146, AND circuits 143, 144, 145 and 149, an RS-type bistable circuit 147 and an OR circuit 148. In the figure, the cache control circuit 14 receives as input data the address transmission signal 301, a clock signal 312, a hit signal 310, a replacement data transmission signal 305 and the replacement completion signal 306. The cache replacement request signal 304 as described above is generated and output by the RS-type bistable circuit 147 which is set upon a miss at the cache memory (hit signal 310=0) and reset upon completion of cache replacement (Replacement completion signal 306=1). The inverter 146 in FIG. 3 outputs a direction signal 311 to be input to the buffer 17. The AND circuit 143 outputs the data transmission signal 302 to give a notice to the instruction execution unit and the AND circuit 149 outputs a write signal 309 to the cache memory 11.

Figures 4, 5:
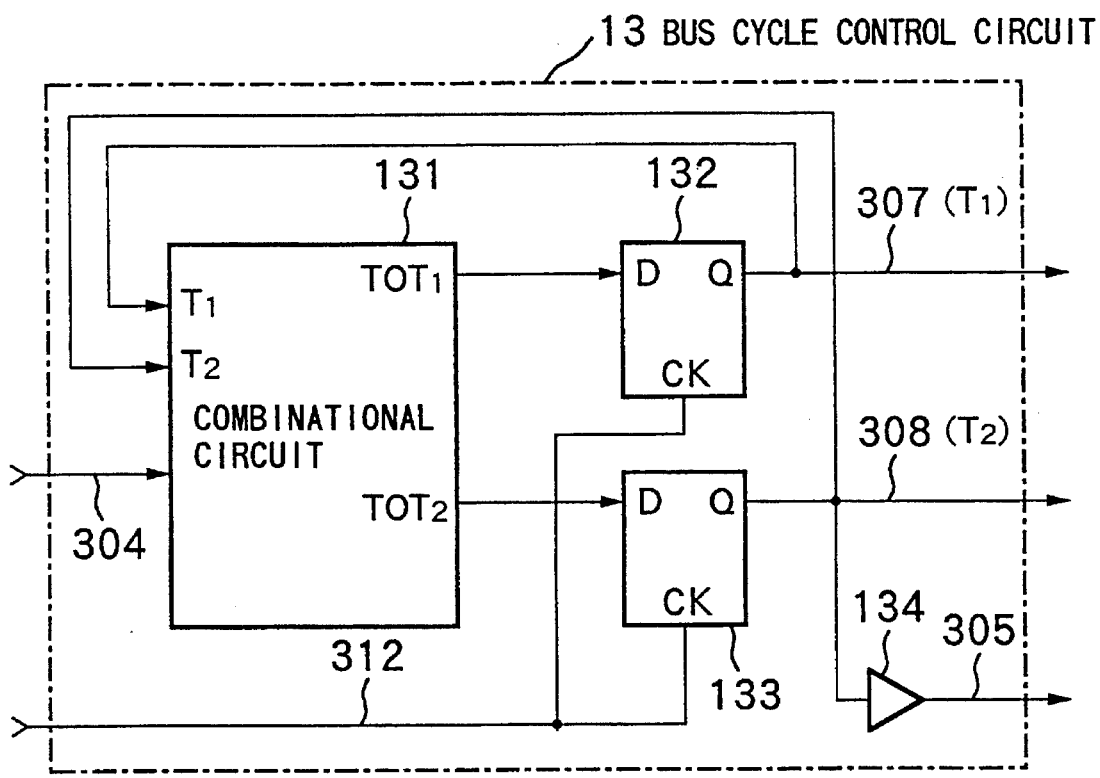
FIG. 4 is a block diagram to show the internal configuration of a bus timing control circuit in FIG. 1.
FIG. 5 is a diagram to show a truth table for a combinational circuit in the bus timing control circuit.

Referring now to FIG. 4, which is a block diagram showing the internal configuration of the bus cycle control circuit 13, the circuit comprises a combinational circuit 131, D-type bistable circuits 132 and 133, and a buffer 134. FIG. 5 is a truth table for the above combinational circuit 131.

As shown in FIG. 5, a bus cycle activated by the bus cycle control circuit 13 has two clock signals: states T1 and T2. The state T1 generates the timing for output of address to the external address terminal 51 and the state T2 generates the timing for input of data from the external data terminal 52. When the cache memory 11 fails to hit (i.e. makes a miss), replacement is performed for each block and requires a plurality of bus cycles. In this embodiment, it is supposed that one block has four words and the data are dividable into words.

In response to the cache replacement request signal (RPREQ) 304 and the clock signal 312 from the cache control circuit 14, the bus cycle control circuit 13 outputs T1 signal 307 and T2 signal 308 and the replacement data transmission signal 305. Among them, T1 signal 307 and T2 signal 308 are returned to the input side of the combinational circuit 131. T1 signal 307 here indicates the status of the first clock of the bus cycle and generates a timing signal for output of the address to the above-mentioned external address terminal 51. Similarly, T2 signal 308 indicates the second clock of the bus cycle and generates a timing signal for input of data from the above-mentioned external data terminal 52.

When the cache replacement request signal 304 becomes active, T1 signal 307 moves to active status and, upon the next clock signal 312, T2 signal 308 also moves to active status, which completes one bus cycle. If the cache replacement request signal 304 is still active for T2 signal status, then the bus cycle is activated again. Such a bus cycle activation is repeated for the number set at the register 19. When the cache replacement request signal 304 from the cache control circuit 14 becomes inactive upon receipt of the replacement completion signal 306 from the counter 18, the bus cycle for cache replacement is completed. In other words, neither of T1 signal 307 and T2 signal 308 are active. Upon completion of cache replacement, the instruction execution unit 80 executes the next instruction and further accesses the cache memory 11.

If the data to be accessed is located at an address contiguous with the data previously accessed, then the cache memory 11 makes a hit after replacement completion, with enabling a high speed access. If the data is located at a non-contiguous address, then the cache replacement procedures are repeated.

Figure 6:
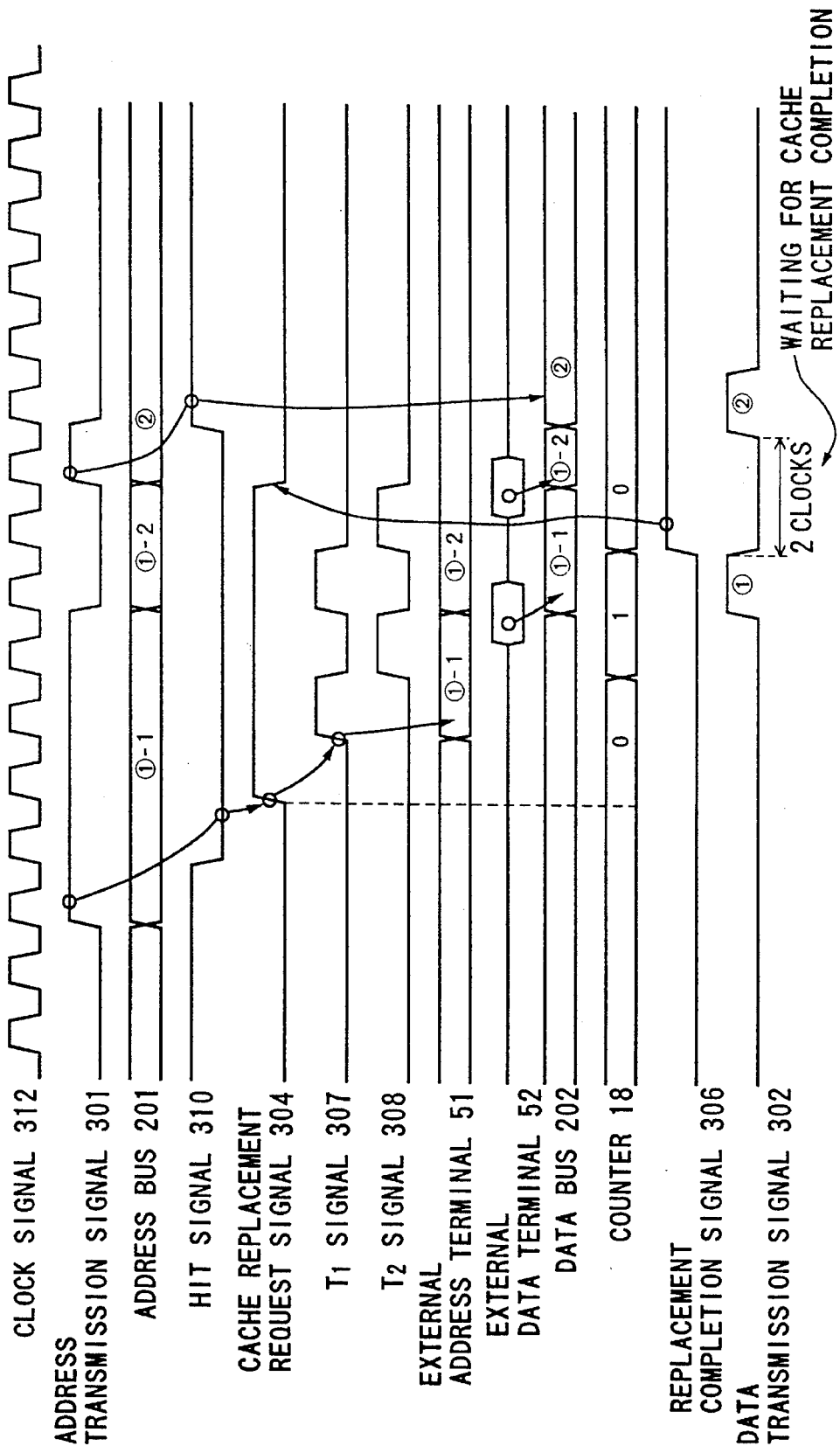
FIG. 6 is a timing chart of replacement processing by the cache memory unit according to an embodiment of the present invention.

Referring now to the timing chart of FIG. 6, the operation of the cache unit 10 according to this embodiment is described. When the cache unit receives a memory address from the instruction execution unit 80, it indexes the cache memory 11 incorporated therein via the address. If the desired data is hit at the cache memory 11, then the applicable data in the cache memory 11 is immediately sent to the instruction execution unit 80 via the data bus 202.

If a miss occurs at the cache memory 11, then the cache replacement request signal 304 output from the cache control circuit 14 in the cache unit 10 becomes active and causes access to the external main storage through the external address terminal 51 and the external data terminal 52 for replacement of the cache memory 11. Here, the cache memory 11 outputs the memory address which caused the miss to the external address terminal 51 and the data input from the main storage is, via the external data terminal 52, registered to the cache memory 11 inside.

The cache replacement request signal 304 is kept active until completion of a series of cache replacement procedures, during which the instruction execution unit cannot proceed to the next instruction execution.

As described above, the address to index the cache memory 11 is, only when necessary, sent from the instruction execution unit 80 to the cache unit 10 via the address bus 201. The timing when the address is sent is notified to the cache control circuit 14 by the address transmission signal 301. Upon completion of address transmission from the instruction execution unit 80, any address thereafter is updated by the address updater 15 and via the register 16 and the buffer 17 output to the address bus 201. Whether the address for the address bus 201 at the instruction execution unit 80 or the address updater 15 in the cache unit 10 is controlled by the direction signal 311 output from the cache control circuit 14 and sent to the buffer 17. When the cache memory 11 makes a hit (hit signal 310 output from the cache memory 11 becomes active), the write signal 309 becomes active and the register 16 which receives the updated address form the address updater 15 continues to output the updated address to the address bus 201.

When the cache memory 11 makes a miss (hit signal 310 output from the cache memory 11 becomes inactive), then the write signal 309 becomes inactive and the register 16 serving in response to the address updater 15 keeps the address where the cache miss occurs (replacement address), and that replacement address is output to the address bus 201.

Then, the control operation of the cache unit 10 will be described in details below focusing on the cache replacement. When the internal data at the cache memory 11 is indexed with the address given by the address bus 201 and the desired data is hit, the applicable data is output to the data bus 202 and at the same time the hit signal 310 is output active and sent to the cache control circuit 14. For a miss, the hit signal 310 is output inactive, and sent to the cache control circuit 14.

When the hit signal 310 is inactive, the cache replacement request signal 304 input from the cache control circuit 14 to the bus cycle control circuit 13 is active. This signal activates the bus cycle at the bus cycle control circuit 13. The bus cycle firstly makes T1 signal 307 active and then T2 signal 308 active, which completes one bus cycle. When T1 signal 307 output from the bus cycle control circuit 13 becomes active, the replacement address on the address bus 201 is via the buffer 22 output to the external address terminal 51. Similarly, when T2 signal 308 output from the bus cycle control circuit 13 becomes active, the replacement data input from the external data terminal 52 is via the buffer 23 sent to the data bus 202 and input to the cache memory 11 for registration.

When T2 signal 308 is active, if the cache replacement request signal 304 is also active, the bus cycle is activated again. The number of bus cycle activations here is determined by the value at the register 19 at that time. Specifically, if the register 19 contains "n", the bus cycle is activated for n times to complete the replacement procedures. The counter 18 counts the number of bus cycles with updating the count each time a bus cycle is activated. The counter 18 is cleared upon the replacement completion signal 306.

The comparer 20 compares the contents in the counter 18 and those in the register 19. If they are identical, the comparer outputs the replacement completion signal 306, which is sent to the cache control circuit 14. This notifies the cache control circuit 14 of the completion of the bus cycle. At the cache control circuit 14, upon input of the replacement completion signal 306, the cache replacement request signal 304 is set inactive, which completes the cache replacement procedures. When the cache replacement procedures end, the instruction execution unit 80 executes the next instruction, and a further access to the cache memory 11 is enabled.

The timing chart of FIG. 6 shows the operation when the register 18 has "2", or the number of bus cycle activations (replacement number) is set to two. The instruction execution unit 80 outputs the address transmission signal 301, the internal address (1—1) is output to the address bus 201 and the cache memory 11 makes a miss (hit signal 311=0), which activates two replacement bus cycles 1—1 and 1-2.

During replacement (while the cache replacement request signal 304=1), the instruction execution unit 80 can process the first contiguous replacement data only (1—1 and 1-2) (data transmission signal 302 =1). Thereafter, for two clocks after completion of cache replacement and before the next data cache (until the data transmission signal 302 becomes "1" again) (cache replacement waiting time), the instruction execution unit 80 cannot proceed to processing of the next data (2).

Figure 7:
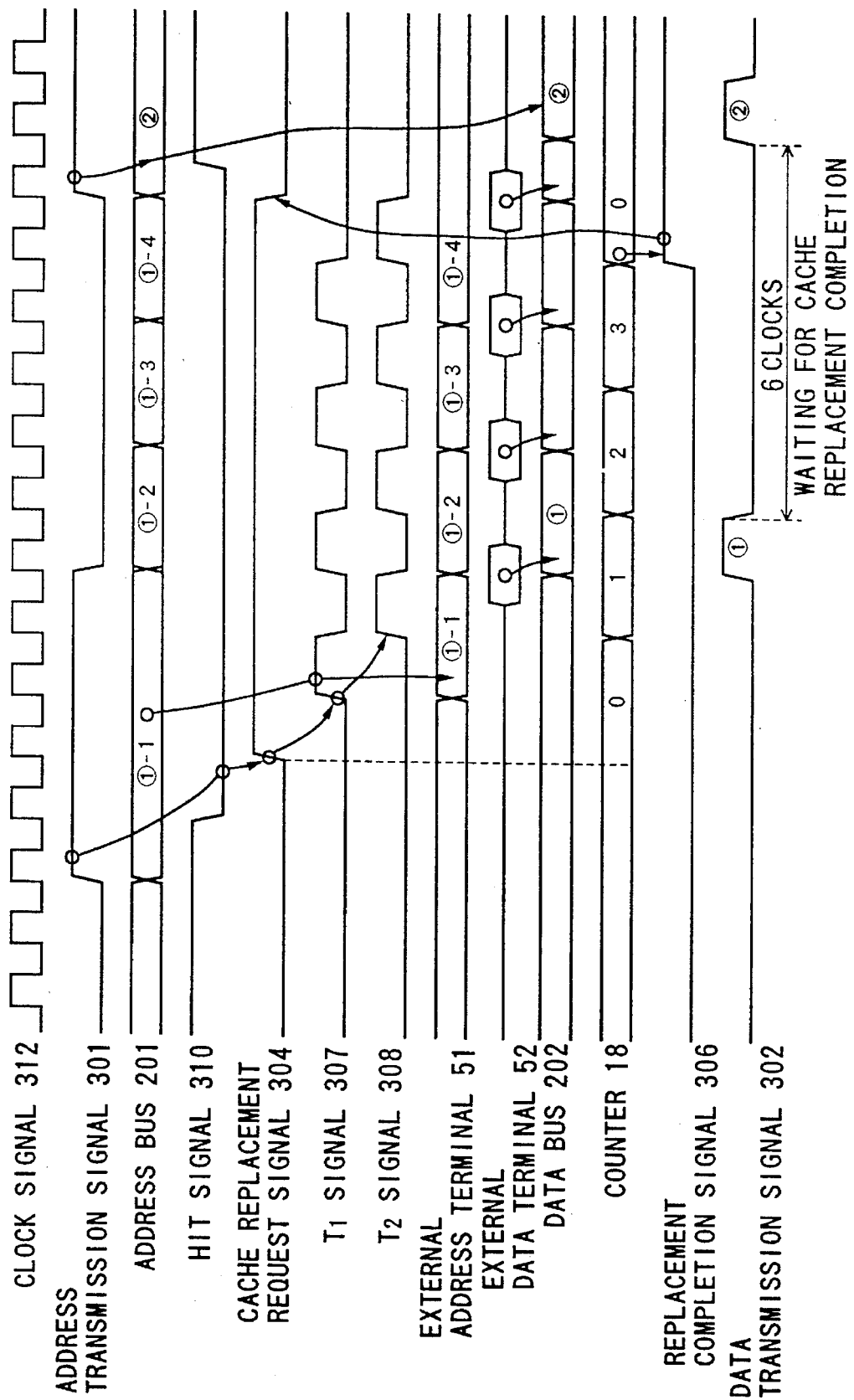
FIG. 7 is another timing chart of replacement processing by the cache memory unit according to an embodiment of the present invention.

In contrast, the timing chart of FIG. 7 shows the operation when the register 18 contains 4, or the number of bus cycle activation (replacement number) is set to four. The instruction execution unit 80 outputs the address transmission signal 301, the internal address (1—1) is output to the address bus 201 and the cache memory 11 makes a miss (hit signal 311=0), which activates four replacement bus cycles (1—1, 1-2, 1-3, 1-4).

During replacement (while the cache replacement request signal 304=1), the instruction execution unit 80 can process the first contiguous replacement data only (1—1, 1-2, 1-3 and 1-4) (Data transmission signal 302=1). Thereafter, for six clocks after completion of cache replacement and before the next data cache (until the data transmission signal 302 becomes "1" again) (cache replacement waiting time), the instruction execution unit 80 cannot proceed to processing of the next data (2).

In conventional microprocessors incorporating a cache unit, the number of bus cycles required for cache replacement is fixed, for example, at four times. If the number is fixed to four for FIG. 7, during the six clocks after replacement completion (replacement completion signal 306="1"), the instruction execution unit 80 can process the contiguous replacement data only (1—1, 1-2, 1-3 and 1-4) and cannot proceed to processing of the next data (2).

If the instruction execution unit 80 is trying access to contiguous data as described above, then a high hit ratio can be obtained. However, if the unit accesses non-contiguous data, it may result in long waiting time.

Thus, when the instruction execution unit 80 accesses non-contiguous data, it is recommended to set a small number for activated bus cycles (value set at the register 19) as in FIG. 6. This shortens cache replacement waiting time, which reduces the overhead at the instruction execution unit 80.

When the instruction execution unit 80 accesses contiguous data, it is recommended to set a large number for the activated bus cycles as in FIG. 7. This brings a higher hit ratio and an improved performance.

As described above, by changing the set value at the register 19 through program depending on the type of accessed data (contiguous or not), replacement can be performed effectively.

Obviously, various modifications can be made to the above embodiments. It is intended to cover in the appended claims all such modifications and variations as fall within the true spirit and scope of the present invention.

What is claimed is:

1. A microprocessor incorporating a cache memory, comprising an instruction execution unit for decoding and executing instructions, and a cache memory unit, said cache memory unit comprising:

a cache memory;

address holding means for holding an address to index said cache memory;

address updating means for updating the address in said address holding means during accessing of said cache memory;

bus cycle control means for activating bus cycles for replacement upon a miss at said cache memory;

counting means for counting a number of bus cycles activated by said bus cycle control means, and providing a count value;

bus cycle number holding means for storing a specified value for said number of bus cycles;

comparison means for comparing the count value from said counting means with the specified value at said bus cycle number holding means, said comparison means outputting a replacement completion signal when said count value and the specified value match; and cache control means for outputting a replacement request signal to request activation of bus cycles to said bus cycle control means until receipt of the replacement completion signal from said comparison means when a miss occurs at said cache memory.

2. A microprocessor incorporating the cache memory unit of claim 1 wherein said bus cycle control means comprises:

bus cycle generation means for providing bus cycles for replacement upon said replacement request signal from said cache control means; and means for outputting to said cache control means a replacement data transmission signal to direct registration of replacement data according to said bus cycles to said cache memory.

3. A microprocessor incorporating the cache memory unit of claim 1 wherein the specified value for said bus cycles is set by a replacement number setting signal output via a program executed at said instruction execution unit.

4. A microprocessor incorporating the cache memory unit of claim 1 wherein said specified value for bus cycles to be held at said bus cycle number holding means is set according to whether the accessed data are contiguous or non-contiguous.

5. A microprocessor incorporating the cache memory unit of claim 1, wherein said bus cycle control means is connected between said cache control means and an external data storage device, said bus cycle control means for receiving a replacement request signal from said cache control means and for outputting a first timing signal to an external storage device address terminal and a second timing signal to an external storage device data terminal, said first timing signal being output to said counting means.

6. A microprocessor incorporating the cache memory unit of claim 5, wherein said bus cycle control means comprising:

a combination logic circuit for receiving as inputs said replacement request signal and said first timing signal and second timing signal;

a first flip-flop coupled to said combinational logic; and a second flip-flop coupled to said combinational logic, said combination logic circuit outputting a first intermediate signal to said first flip-flop and a second intermediate signal to said second flip-flop, wherein said first flip-flop outputs said first timing signal and said second flip-flop outputs said second timing signal upon reception of a clock signal.

7. A microprocessor incorporating the cache memory unit of claim 5, wherein said bus cycle control means comprises:

a combination logic circuit for receiving as inputs said replacement request signal, said first timing signal and said second timing signal.

8. A microprocessor incorporating the cache memory unit of claim 1, wherein said cache control means is connected between said bus cycle control means and said cache memory and said instruction execution unit, said bus cycle control means comprises:

means for outputting said replacement request signal upon a miss signal from said cache memory and for resetting said replacement request signal upon said replacement completion signal.

9. A microprocessor incorporating the cache memory unit of claim 1, wherein said bus cycle control means is connected between said cache control means and an external data storage device.

10. A microprocessor incorporating the cache memory unit of claim 1 wherein said bus cycle control means receives a replacement request signal from said cache control means and outputs a first timing signal to an external storage device address terminal and a second timing signal to an external storage device data terminal, said first timing signal being output to said counting means.

11. A microprocessor incorporating the cache memory unit of claim 1, wherein said cache control means is connected between said bus cycle control means and said cache memory and said instruction execution unit.

12. A microprocessor incorporating the cache memory unit of claim 1, wherein said bus cycle control means comprises:

means for outputting said replacement request signal upon a miss signal from said cache memory and for resetting said replacement request signal upon said replacement completion signal.

13. A microprocessor incorporating a cache memory unit, comprising an instruction execution unit for decoding and executing instructions, and a cache memory unit, said cache memory unit comprising:

a cache memory;

address holding means for holding an address to index said cache memory;

address updating means for updating the address in said address holding means during accessing of said cache memory;

bus cycle control means for activating bus cycles for data block replacement upon a miss at said cache memory;

counting means for counting a number of bus cycles activated by said bus cycle control means;

bus cycle number holding means for keeping a specified value for said number of bus cycles set through a program executed at said instruction execution unit, said specified number corresponding to contiguousness or non-contiguousness of data addresses accessed by said instruction execution unit;

comparison means for comparing a count value from said counting means and said specified value, said comparison means outputting a replacement completion signal when said count value and said specified value match; and cache control means for outputting a replacement request signal to request activation of bus cycles to said bus cycle control means until receipt of the replacement completion signal from said comparison means when a miss occurs at said cache memory.

14. A cache memory for improving a hit ratio thereof by selecting a number of bus cycles required to replace a data block upon a cache memory miss, comprising:

memory means for temporarily storing blocks of data retrieved from an external data storage device for use by an execution unit; and cache control means, connected between said memory means and said execution unit, for initiating a data block replacement upon a miss condition when a data address requested by said execution unit is not found in said memory means, said execution unit for selecting a bus cycle number for controlling the number of bus cycles required to complete the data block replacement, said execution unit selecting a first bus cycle number when data addresses to be accessed are contiguous addresses and a second bus cycle number when the data addresses to be accessed are non-contiguous addresses.

15. A cache memory as recited in claim 14 wherein said first bus cycle number for contiguous addresses is larger than said second bus cycle number for non-contiguous addresses.

16. A. cache memory as recited in claim 14, further comprising:

a register for storing said bus cycle number from said execution unit;

a counter for counting a number of bus cycles during said data block replacement; and a comparator, connected to said register and to said counter, for outputting a data block replacement completion signal when said number of bus cycles from said counter matches said bus cycle number from said register.

17. A cache memory as recited in claim 14, further comprising:

a bus cycle control circuit connected between said cache control means and said external data storage device, said bus cycle control circuit for receiving a data block replacement request signal from said cache control means and for outputting a first timing signal to an external storage device address terminal and a second timing signal to an external storage device data terminal, said first timing signal being output to said counter for counting a number of bus cycles.

18. A cache memory as recited in claim 17, wherein said cycle control circuit comprises:

a combinational logic circuit for receiving as inputs said data block replacement request signal and said first timing signal and said second timing signal;

a first flip-flop coupled to said combinational logic; and a second flip-flop coupled to said combinational logic, said combinational logic outputting a first intermediate signal to said first flip-flop and a second intermediate signal to said second flip-flop, wherein said first flip-flop outputs said first timing signal and said second flip-flop outputs said second timing signal upon reception of a clock signal.

19. A cache memory as recited in claim 18 wherein said first flip flop and said second flip-flop each comprise a D-type flip-flop.

20. A cache memory as recited in claim 17 further comprising:

an address buffer connected between said external data storage device address terminal and an address bus; and a data buffer connected between said external data storage device data terminal and a data bus, said first timing signal for enabling said first buffer, and said second timing signal for enabling said second buffer.

* * * * *